Figure 1:
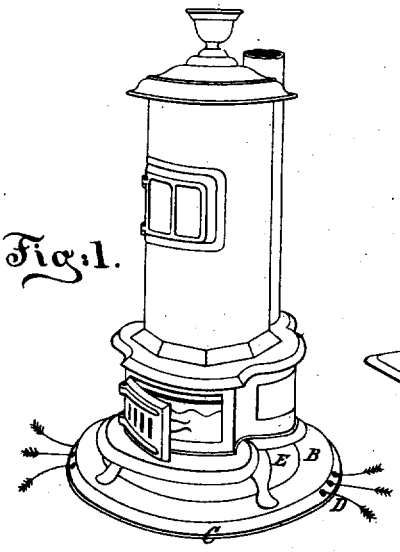

C. BROWNELL.

Platform for Stoves.

No. 6,460. Reissued May 25, 1875.

Witnesses:

John Buckingham

Wm. C. Dey.

Clark Brownell

Inventor:

The Newark Tea Tray Co by their attorney

Thomas D. Stetson

THE GRAPHIC CO. PHOTO-LITH. 39 & 41 PARK PLACE, N.Y.

UNITED STATES PATENT OFFICE.

NEWARK TEA-TRAY COMPANY, OF NEWARK, NEW JERSEY, ASSIGNEE, BY MESNE ASSIGNMENTS, OF CLARK BROWNELL.

IMPROVEMENT IN PLATFORMS FOR STOVES.

Specification forming part of Letters Patent No. 105,773, dated July 26, 1870; reissue No. 6,460, dated May 25, 1875; application filed February 1, 1875.

*To all whom it may concern:*

Be it known that CLARK BROWNELL, of Troy, Rensselaer county, New York, assignor to the undersigned, the NEWARK TEA-TRAY COMPANY, of Newark, New Jersey, invented certain Improvements relating to Stove-Platforms, of which the following is a specification:

This invention has relation to platforms for stoves, portable furnaces, and analogous heaters; and its object is to provide a platform that shall be free from the defects characterizing the devices heretofore employed in connection with such structures for protecting the floor or the carpet from injury, and that shall, at the same time, be neat and ornamental in its appearance, so as to be merchantable for parlor purposes.

The necessity for some shield or platform interposed between the base of the stove and the floor or carpet beneath, to protect the latter from injury from the too intense heat radiated downward from the stove, has long been understood. Before the present invention there had been used, among other devices for the purpose indicated, a single piece of sheet metal, laid flat upon the floor or carpet, the stove standing directly upon this interposed metallic shield. The prime and serious defect in this device was its insufficiency to afford the requisite protection to the surface beneath. The exclusion both of air and of light from the under side of the metal tended to produce sweating in the covered surface, and the immediate contact of the flat metal sheet with the floor or carpet furnished too ready transmission of the heat from the stove; and thus it often happened that the floor, or carpet, or oil-cloth was seriously injured, or even ruined. This metal sheet, moreover, to lie evenly upon the floor, required to be secured at its edges by nails or equivalent means, which was not a convenient thing to do, and gave results by no means sightly.

Another plan consisted in using a platform of wood laid upon the floor. Here, again, sweating might occur, and to protect the upper surface of these wood platforms from burning or charring, which would quickly have made them unsightly, and so unserviceable, they were usually covered with zinc or other thin sheet metal, this metal generally being bent down over the edges, and secured by nailing. The shrinkage of the wood in such structures, under the intense heat to which they were subjected, would either cause the metal to buckle and rumple, or would cause it to tear loose from the nails. Moreover, the difficulty of applying the metal in this way practically restricted platforms thus constructed to the rectangular form. The circular and oval forms, which are best adapted to the usual styles of parlor heating-stoves, could not well be made by this method, on account of the difficulty of causing the metal to lie smooth upon the edge of the board frame or foundation.

As distinguished from these older structures, the main characteristics of the present invention are as follows: first, apertures communicating between an air-space and the exterior of the platform, by which ventilation is secured, as well as the admission of light to the portion of the carpet that is beneath the platform; second, a metallic body or surface with a finished molded edge extending down therefrom; third, in connection with such metallic body or surface, provided with a finished molded edge, suitable supports placed within such molded edge, with or without being attached thereto.

Other features of improvement characterizing the new platform are, a lining of tin or of cement, or any other suitable non-conducting material, for the purpose of increasing the fire-proof quality of the structure, the elevation of the central part into a dome or conical form, in order to increase the size of the air-chamber, promote its ventilation, throw the dust toward the edge of the surface of the platform, and reflect the heat from beneath the stove out into the room, making the central part of the platform detachable, to facilitate the removal of dirt from the air-chamber.

The domed central part may be fluted or otherwise ornamented, and the ring or frame may be handsomely molded and properly decorated, so as to present a tasty appearance to the eye.

From these various elements of construction, embodied in the improved platform, as more fully hereinafter set forth, the following results are obtained:

First. The ventilating-apertures contribute to protect the floor, carpet, or oil-cloth from injury, either by sweating or by the more direct action of heat, by providing a circulation and constant change of the air within the air-chamber.

Second. This result may be attained in a still larger degree by the use of a lining, which may be employed when deemed desirable. Such lining, if made of cement or any other non-conducting material, acts through its non-conducting quality. If made of sheet metal, as tin, there will be a little interval or space between the body of the platform and the metal lining, and this will retard the transmission of heat. Furthermore, a lining, whether of metal, cement, or other suitable material, serves to give rigidity to the body of the platform, when the latter is made of wrought metal, and thus protect it from bruises and indentations, and from being twisted out of shape.

Third. By placing supports inside of the molded edge, and underneath that part of the platform which is to sustain the weight of the stove, a much lighter sheet of metal can be used than would be possible were the whole weight to be sustained by such downturned edge or molded border of the platform.

Fourth. By making the body or surface of the platform of metal and providing it with a finished molded edge, the structure being provided with suitable supports underneath, a highly ornamental article can be produced of circular or oval form, or any other desired outline, as well as rectangular.

Fifth. The domed center, which rises above the level on which the stove rests, reflects the heat outward in the room. It sheds the dust outward toward the edge of the platform, and it enlarges the air-space below, as well as contributes to aid the circulation of the air, when it is provided with proper apertures.

Sixth. By making the dome removable access is had to the interior of the platform, and thus the space below can be easily cleaned.

Seventh. By fluting the dome additional rigidity is imparted to it, and its ornamental character increased.

Figure 4:
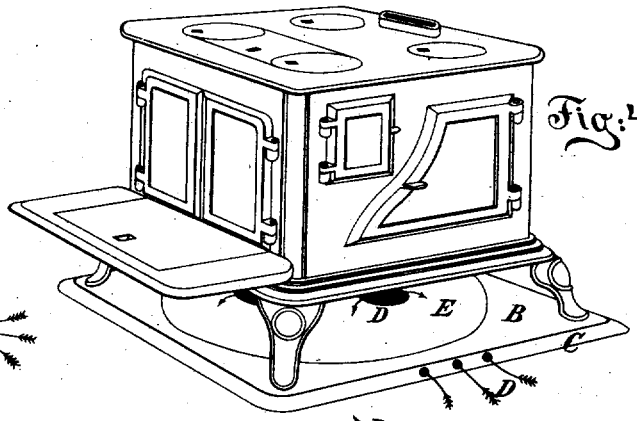
Figure 2:
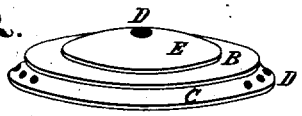
Figure 5:
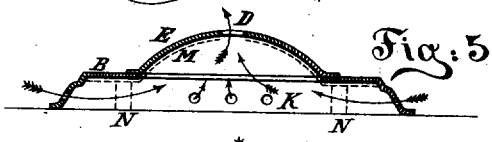
Figure 3:
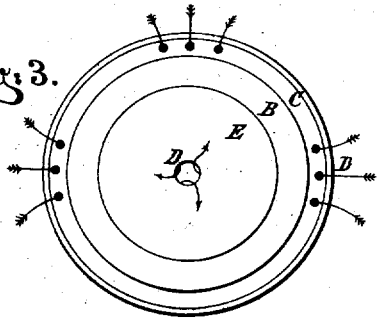
Figure 6:
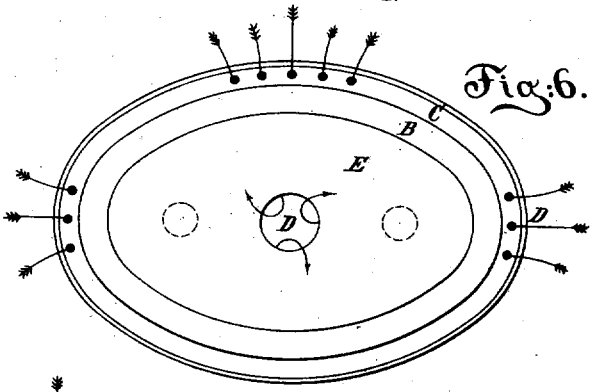
Figure 7:
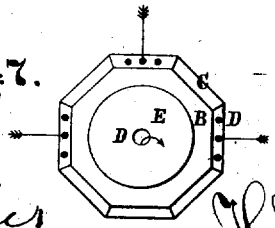

Referring to the drawings, Figure 1 is a perspective view of a parlor-stove resting on one of these improved platforms of circular form. Fig. 2 is a perspective view of the same platform. Fig. 3 is a plan view of the same. Fig. 4 is a perspective view of a cook-stove resting on one of these platforms provided with rounded corners. Fig. 5 is a vertical section of one of the ventilated platforms, the course of the arrows indicating the direction of the air-currents. Fig. 6 is a plan view of an oval-shaped platform. Fig. 7 is a plan view of an octagonal platform.

Like letters refer to corresponding parts.

B represents the body or surface of the platform, the central part E thereof being formed into a dome or elevated shape, while the edge C is molded or shaped, by any of the ordinary means, into any neat and ornamental form. Apertures D, of greater or less extent and number, are provided in the edge or flange of the platform, at the sides and back, for the admission of fresh air and of light; and other apertures, one or more, are provided in the dome for the escape of the heated air. M in Fig. 5 indicates in dotted lines a lining of the main body. N N are internal supports for taking the weight of the stove off from the flange formed on the outer edge of the platform. As the platform may be made of wrought metal, or any other suitable material, as well as cast metal, and therefore be made quite thin, these internal supports may come to constitute an important element in the structure. The space K underneath the platform may be simply sufficient for the purpose described, and the different parts may have any desired rise. The dome may be made of any form that fancy or utility may suggest. The perforations through which the air passes may be small round holes, slots of suitable length, or open-work grating, as may be preferred, or the air may pass in through notches in the bottom edge.

What is claimed as new in stove-platforms is—

1. An air-chamber beneath the central portion, in combination with one or more apertures connecting therewith, adapted to allow a circulation of air in such chamber, as and for the purposes herein specified.

2. In connection with an air space or chamber, the combination of one or more apertures in or near the base, and one or more apertures in or near the top, to cause the air to circulate through the space by reason of its heat, substantially as specified.

3. A flat surface, upon which the stove-legs rest, in combination with a higher central portion, affording a deeper space for defending against heat, substantially as herein specified.

4. In combination with a stove-platform, a dome or elevated central part, constructed as described, so as to be capable of attachment or removal at will, substantially as and for the purposes described.

5. In combination with a stove-platform, a lining of sheet metal, cement, or any analogous non-conducting material, substantially as described.

6. The combination of a metallic upper surface, having an air-space beneath, with a finished molded edge extending downward from such upper surface or body, substantially as specified.

7. A metallic body or upper surface, and a flange or edge extending downward therefrom, inclosing an air-space under the central portion, in combination with internal supports beneath the body, upon which the weight of the stove rests, substantially as described.

In testimony whereof one of the proper officers of the NEWARK TEA-TRAY COMPANY has hereunto set his hand this 29th day of January, 1874, in the presence of two subscribing witnesses.

NEWARK TEA-TRAY CO.
WALTER M. CONGER, *Secretary.*

Witnesses:
M. A. VAN NAMEE,
WM. C. DEY.